United States Patent
Chen et al.

(10) Patent No.: US 12,047,942 B2
(45) Date of Patent: Jul. 23, 2024

(54) INFORMATION SENDING METHOD AND TERMINAL DEVICE

(71) Applicant: VIVO MOBILE COMMUNICATION CO., LTD., Chang'an Dongguan (CN)

(72) Inventors: Xiaohang Chen, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 318 days.

(21) Appl. No.: 17/390,446

(22) Filed: Jul. 30, 2021

(65) Prior Publication Data

US 2021/0360661 A1 Nov. 18, 2021

Related U.S. Application Data

(63) Continuation of application No. PCT/CN2020/070901, filed on Jan. 8, 2020.

(30) Foreign Application Priority Data

Jan. 30, 2019 (CN) .......................... 201910094299.4

(51) Int. Cl.
*H04W 72/12* (2023.01)
*H04W 72/1268* (2023.01)
*H04W 74/0833* (2024.01)

(52) U.S. Cl.
CPC .... *H04W 72/1268* (2013.01); *H04W 74/0833* (2013.01)

(58) Field of Classification Search
None
See application file for complete search history.

(56) References Cited

U.S. PATENT DOCUMENTS

| | | |
|---|---|---|
| 2014/0321436 A1 | 10/2014 | Kwon et al. |
| 2017/0094673 A1 | 3/2017 | Jitsukawa |
| 2017/0289973 A1 | 10/2017 | Yang et al. |
| 2019/0045552 A1 | 2/2019 | Blankenship et al. |
| 2019/0363843 A1* | 11/2019 | Gordaychik ............. H04L 1/08 |
| 2020/0383147 A1* | 12/2020 | Yoon ................... H04L 27/2607 |

FOREIGN PATENT DOCUMENTS

| | | |
|---|---|---|
| CN | 104756577 A | 7/2015 |
| CN | 105611637 A | 5/2016 |
| CN | 106465395 A | 2/2017 |
| CN | 108886435 A | 11/2018 |

(Continued)

OTHER PUBLICATIONS

International Search Report & Written Opinion related to Application No. PCT/CN2020/070901; reported on Apr. 15, 2020.

(Continued)

*Primary Examiner* — Hong Shao
(74) *Attorney, Agent, or Firm* — von Briesen & Roper, s.c.

(57) ABSTRACT

Embodiments of the present disclosure provide an information sending method and a terminal device. The method includes: obtaining a PUSCH transmission occasion; and determining, based on a location relationship between the PUSCH transmission occasion and a slot boundary, whether to send a PUSCH at the PUSCH transmission occasion, where the PUSCH corresponds to a random access message.

15 Claims, 4 Drawing Sheets

(56) References Cited

FOREIGN PATENT DOCUMENTS

| KR | 20000060537 | A  | 10/2000 |
|----|-------------|----|---------|
| WO | 2016048027  | A2 | 3/2016  |
| WO | 2017167242  | A1 | 10/2017 |
| WO | 2018228460  | A1 | 12/2018 |

OTHER PUBLICATIONS

NTT Docomo, Inc.; "Offline summary for AI 7.3.3.4 UL data transmission procedure"; 3GPP TSG RAN WG1 Meeting #91, Reno, USA, Nov. 27-Dec. 1, 2017; R1-1721510.
Vivo; "PUSCH enhancements for URLLC"; 3GPP TSG RAN WG1 Meeting #95, Spokane, USA, Nov. 12-16, 2018, R1-1812314.
Indian Office Action related to Application No. 202127037390 reported on Mar. 31, 2022.
First Korean Office Action related to Application No. 10-2021-7026365; reported on Jul. 19, 2023.
Indian Office Action related to Application No. 202127037390 reported on Jul. 11, 2023.

* cited by examiner

INFORMATION SENDING METHOD AND TERMINAL DEVICE

CROSS-REFERENCE TO RELATED APPLICATION

This application is a continuation application of PCT Application No. PCT/CN2020/070901 filed on Jan. 8, 2020, which claims priority to Chinese Patent Application No. 201910094299.4 filed in china on Jan. 30, 2019, the disclosures of which are incorporated herein by reference in their entireties.

TECHNICAL FIELD

The present disclosure relates to the field of communications technologies, and in particular, to an information sending method and a terminal device.

BACKGROUND

In a time division duplexing (TDD) scenario, a terminal device may initiate random access channel (RACH) transmission to a network device via a 2-step RACH process. Specifically, the terminal device may send a random access message (which may be represented by MsgA) to the network device. After receiving the MsgA, the network device may send another random access message (which may be represented by MsgB) to the terminal device. After the terminal device receives MsgB, the 2-step RACH process is completed.

Generally, when sending MsgA to the network device, the terminal device may send a physical uplink shared channel (PUSCH) to the network device, where the PUSCH carries the MsgA, and it can be assumed that timing advance (TA) of the PUSCH is 0. However, in practical applications, when a terminal device sends a PUSCH carrying MsgA to a network device, a transmission occasion of the PUSCH is likely to be at a boundary of a slot. In this case, the PUSCH interferes with transmission or reception of an adjacent slot, thus affecting normal communication of the terminal device.

SUMMARY

According to a first aspect, an information sending method is provided, where the method is applied to a terminal device and includes:
  obtaining a physical uplink shared channel (PUSCH) transmission occasion; and
  determining, based on a location relationship between the PUSCH transmission occasion and a slot boundary, whether to send a PUSCH at the PUSCH transmission occasion, where the PUSCH corresponds to a random access message.

According to a second aspect, a terminal device is provided, including:
  an obtaining module, configured to obtain a PUSCH transmission occasion; and
  a sending module, configured to: determine, based on a location relationship between the PUSCH transmission occasion and a slot boundary, whether to send a PUSCH at the PUSCH transmission occasion, where the PUSCH corresponds to a random access message.

According to a third aspect, a terminal device is provided, including: a processor, a memory, and a computer program that is stored in the memory and that can run on the processor. When the computer program is executed by the processor, steps in the method provided in the first aspect are implemented.

According to a fourth aspect, a non-transitory computer-readable storage medium is provided, where the non-transitory computer-readable storage medium stores a computer program. When the computer program is executed by a processor, steps in the method provided in the first aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DETAILED DESCRIPTION OF EMBODIMENTS

Figure 1:
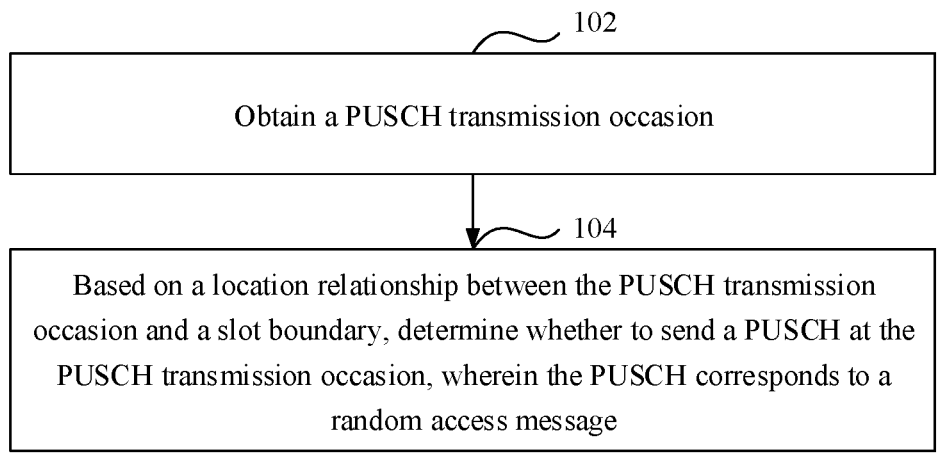
FIG. 1 is a schematic flowchart of an information sending method according to an embodiment of the present disclosure.

In a TDD scenario, a terminal device may initiate RACH transmission to a network device via a 2-step random access (2-step RACH) process. Specifically, the terminal device may send a random access message (MsgA) to the network device. After receiving the MsgA, the network device may send another random access message (MsgB) to the terminal device. After the terminal device receives MsgB, the 2-step RACH process is completed.

When sending MsgA to the network device, the terminal device may send at least one of MsgA including a PUSCH and MsgA including a physical random access channel (PRACH). The terminal device may send the PUSCH and the PRACH at a random access message transmission occasion. Alternatively, the terminal device may send the PUSCH and the PRACH on any orthogonal frequency division multiplexing (OFDM) symbol in a slot.

Generally, different terminal devices are located at different locations, and distances between different terminal devices and a network device are different. Accordingly, different terminal devices have different transmission delays when communicating with the network device. To ensure that the network device can receive uplink signals from different terminal devices in a timing alignment manner, an offset needs to be added based on downlink timing when the terminal devices send the uplink signals. The offset is a TA value, which can be configured by the network device. For a terminal device close to the network device, a transmission delay is small, so that a small TA value needs to be configured. For a terminal device far from the network device, a transmission delay is large, so that a large TA value needs to be configured.

In practical applications, when sending a PRACH to a network device, a terminal device may send a random access preamble, and a cyclic prefix (CP) and a guard interval may be added to the preamble for offsetting a transmission delay.

However, if the terminal device does not have valid TA when sending a PUSCH to the network device, the PUSCH may not have a sufficient guard interval to offset a transmission delay. In this case, if the PUSCH sent by the terminal device is at a boundary of a slot, the PUSCH interferes with transmission or reception of an adjacent slot, thus affecting normal communication of the terminal device.

In view of this, the embodiments of the present disclosure provide an information sending method and a terminal device. The method includes obtaining a PUSCH transmission occasion; and determining, based on a location relationship between the PUSCH transmission occasion and a slot boundary, whether to send a PUSCH at the PUSCH transmission occasion, where the PUSCH corresponds to a random access message MsgA.

In this way, when initiating a 2-step RACH process to the network device, the terminal device can determine, based on the location relationship between the PUSCH transmission occasion and the slot boundary, whether to send the PUSCH corresponding to the random access message MsgA at the PUSCH transmission occasion. Therefore, when the PUSCH transmission occasion is at the slot boundary, according to the technical solution of the embodiments of the present disclosure, the PUSCH can be prevented from interfering with the transmission or reception of the adjacent slot, thereby guaranteeing the normal communication of the terminal device.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solution of the present disclosure may be applied to various communications systems, for example: a long term evolution (LTE) system/a long term evolution advanced (LTE-A) system, an LTE frequency division duplex (FDD) system, an LTE time division duplex (TDD) system, a universal mobile telecommunications system (UMTS) or a worldwide interoperability for microwave access (WiMAX) communications system, a 5th generation (5G) system, or a new radio (NR) system.

The terminal device may be understood as user equipment (UE), also known as a mobile terminal, mobile user equipment, or the like, may communicate with one or more core networks through a radio access network (for example, RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, and the user equipment can also be a flying device such as a drone and an aircraft, which exchanges voice and/or data with the radio access network.

The network device may be understood as a core network or a base station. The base station may be a base transceiver station (BTS) in a global system for mobile communications (GSM) or a code division multiple access (CDMA) system, a NodeB in wideband code division multiple access (WCDMA) system, an evolved NodeB (eNB, or e-NodeB) in an LTE system, a 5G gNodeB (gNB), or a network side device in a subsequent evolved communications system. This is not limited in the present disclosure. However, for ease of description, the following embodiments use gNB as an example for description.

The following describes the technical solutions in various embodiments of the present disclosure in detail with reference to the accompanying drawings.

FIG. 1 is a schematic flowchart of an information sending method according to an embodiment of the present disclosure. The method is applied to a terminal device and includes the following steps.

S102: Obtain a PUSCH transmission occasion.

When initiating RACH transmission to a network device via a 2-step RACH process, the terminal device may send a random access message MsgA including a PUSCH to the network device. In this case, MsgA includes both a PRACH and the PUSCH. In this embodiment, only the PUSCH corresponding to MsgA is described.

In this embodiment, before sending the PUSCH corresponding to the MsgA, the terminal device can obtain the PUSCH transmission occasion for the terminal device to transmit the PUSCH. The PUSCH transmission occasion may be preconfigured by the network device and may include one or more OFDM symbols.

The PUSCH transmission occasion may also be associated with a PRACH transmission occasion, which may specifically be: one PUSCH transmission occasion is associated with one PRACH transmission occasion; one PUSCH transmission occasion is associated with a plurality of PRACH transmission opportunities; a plurality of PUSCH transmission opportunities are associated with one PRACH transmission occasion; or a plurality of PUSCH transmission opportunities are associated with a plurality of PRACH transmission opportunities. This is not specifically limited herein.

The terminal device may perform S104 after obtaining the PUSCH transmission occasion.

S104: Determine, based on a location relationship between the PUSCH transmission occasion and a slot boundary, whether to send a PUSCH at the PUSCH transmission occasion, where the PUSCH corresponds to a random access message.

After obtaining the PUSCH transmission occasion, the terminal device may determine the location relationship between the PUSCH transmission occasion and the slot boundary, so as to determine, based on the location relationship, whether to send the PUSCH to the network device at the PUSCH transmission occasion.

In a first embodiment, if the PUSCH transmission occasion is at the slot boundary, the terminal device may skip sending the PUSCH at the PUSCH transmission occasion, that is, giving up sending the PUSCH at the PUSCH transmission occasion. In this way, the PUSCH can be prevented from interfering with transmission or reception of an adjacent slot.

In this embodiment, that the PUSCH transmission occasion is at the slot boundary may include at least the following two cases:

Case 1: A start location of the PUSCH transmission occasion is at a start location of a slot.

For example, a first OFDM symbol of the PUSCH transmission occasion is a first OFDM symbol of the slot.

Case 2: An end location of the PUSCH transmission occasion is at an end location of the slot.

For example, a last OFDM symbol of the PUSCH transmission occasion is a last OFDM symbol of the slot.

When the PUSCH transmission occasion meets at least one of the above cases, the terminal device may skip sending the PUSCH at the PUSCH transmission occasion.

Figure 2:
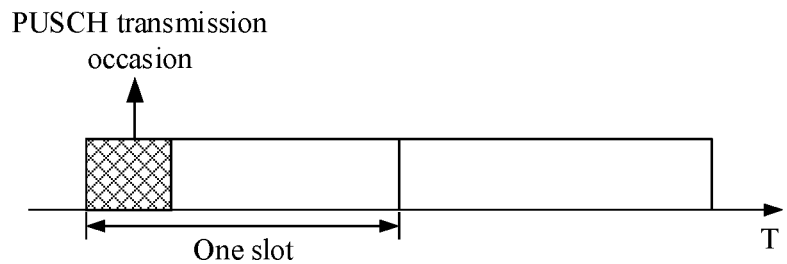
FIG. 2 is a schematic diagram of an information sending method according to an embodiment of the present disclosure.
Figure 3:
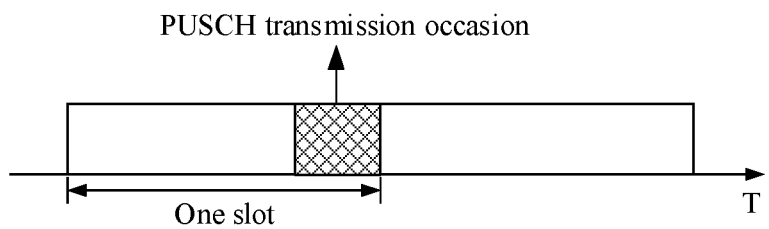
FIG. 3 is a schematic diagram of an information sending method according to an embodiment of the present disclosure.
Figure 4:
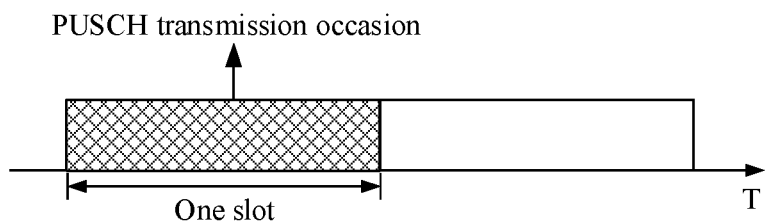
FIG. 4 is a schematic diagram of an information sending method according to an embodiment of the present disclosure.

For details, refer to FIGS. 2 to 4.

FIG. 2 shows two slots. In the first slot, the start location of the PUSCH transmission occasion is that of the slot. In this case, the terminal device may skip sending the PUSCH at the PUSCH transmission occasion to prevent the PUSCH from interfering with an adjacent slot.

FIG. 3 shows two slots. In the first slot, the end location of the PUSCH transmission occasion is that of the slot. In this case, the terminal device may skip sending the PUSCH at the PUSCH transmission occasion to prevent the PUSCH from interfering with an adjacent slot.

FIG. 4 shows two slots. In the first slot, the start location of the PUSCH transmission occasion is that of the slot, and the end location of the PUSCH transmission occasion is that of the slot, that is, the PUSCH transmission occasion occupies one slot. In this case, the terminal device may skip sending the PUSCH at the PUSCH transmission occasion to prevent the PUSCH from interfering with an adjacent slot.

In a second embodiment, if the PUSCH transmission occasion is at the slot boundary, the terminal device may send the PUSCH at the PUSCH transmission occasion, and skip sending the PUSCH at a boundary of the PUSCH transmission occasion. The skipping sending the PUSCH at a boundary of the PUSCH transmission occasion may be understood as: the start location of the PUSCH transmission occasion is not an actual start location of a time domain resource occupied by the PUSCH during transmission of the PUSCH; or the end location of the PUSCH transmission occasion is not an actual end location of the time domain resource occupied by the PUSCH during transmission of the PUSCH.

Thus, although the terminal device sends the PUSCH at the PUSCH transmission occasion, because the PUSCH is not transmitted at the boundary of the PUSCH transmission occasion, the PUSCH can be prevented from interfering with the adjacent slot.

In this embodiment, optionally, the skipping sending the PUSCH at a boundary of the PUSCH transmission occasion may include at least one of the following:

Case 1: If a start location of the PUSCH transmission occasion is a start location of a slot, the PUSCH is not sent on first M OFDM symbols of the PUSCH transmission occasion. Specifically, a start symbol of the PUSCH sent on the PUSCH transmission occasion is at the $(M+1)^{th}$ symbol of the PUSCH transmission occasion.

M is an integer greater than or equal to 0. When the terminal device is close to the network device, M may be 0; and when the terminal device is far from the network device, M may be an integer greater than 0. The farther the terminal device is from the network device, the greater M may be. This is specifically determined based on an actual status, and is not specifically limited herein.

In this embodiment, M may be a predefined value, or may be preconfigured by the network device. This is not specifically limited herein.

Case 2: If an end location of the PUSCH transmission occasion is an end location of the slot, the PUSCH is not sent on first N OFDM symbols of the PUSCH transmission occasion. Specifically, it is assumed that the PUSCH transmission occasion includes L symbols in total, an end symbol of the PUSCH sent on the PUSCH transmission occasion is at the $(L-N)^{th}$ symbol of the PUSCH transmission occasion, and L is an integer greater than N.

N is an integer greater than or equal to 0. When the terminal device is close to the network device, N may be 0; and when the terminal device is far from the network device, N may be an integer greater than 0. The farther the terminal device is from the network device, the greater N may be. This is specifically determined based on an actual status, and is not specifically limited herein.

It should be noted that N may be the same as or different from M as described above.

In this embodiment, N may be a predefined value, or may be preconfigured by the network device. This is not specifically limited herein.

Figure 5:
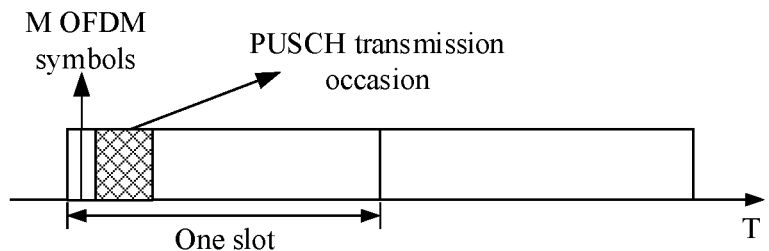
FIG. 5 is a schematic diagram of an information sending method according to an embodiment of the present disclosure.
Figure 6:
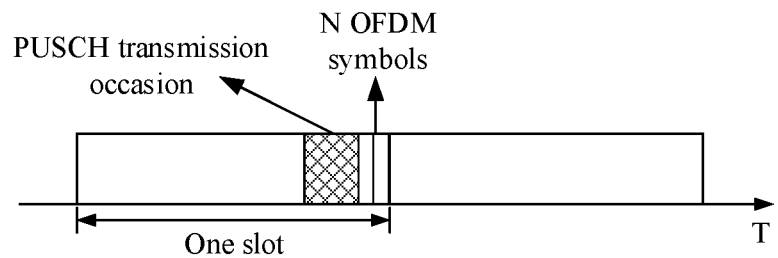
FIG. 6 is a schematic diagram of an information sending method according to an embodiment of the present disclosure.
Figure 7:
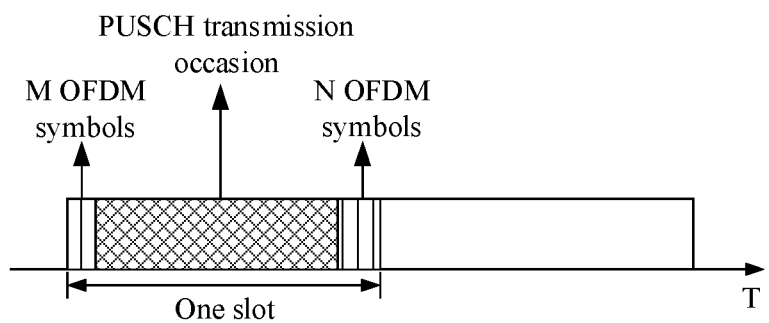
FIG. 7 is a schematic diagram of an information sending method according to an embodiment of the present disclosure.

For ease of understanding, refer to FIGS. 5 to 7.

FIG. 5 shows two slots. In the first slot, the start location of the PUSCH transmission occasion is that of the slot. In this case, the terminal device may send the PUSCH at the PUSCH transmission occasion but skip sending the PUSCH at first M OFDM symbols of the PUSCH transmission occasion to prevent the PUSCH from interfering with an adjacent slot.

FIG. 6 shows two slots. In the first slot, the end location of the PUSCH transmission occasion is that of the slot. In this case, the terminal device may send the PUSCH at the PUSCH transmission occasion but skip sending the PUSCH at last N OFDM symbols of the PUSCH transmission occasion to prevent the PUSCH from interfering with an adjacent slot.

FIG. 7 shows two slots. In the first slot, the start location of the PUSCH transmission occasion is that of the slot, and the end location of the PUSCH transmission occasion is that of the slot, that is, the PUSCH transmission occasion occupies one slot. In this case, the terminal device may send the PUSCH at the PUSCH transmission occasion but skip sending the PUSCH at first M OFDM symbols and last N OFDM symbols of the PUSCH transmission occasion to prevent the PUSCH from interfering with an adjacent slot. M and N may be the same or different.

In a third embodiment, if the PUSCH transmission occasion is not at the slot boundary, the terminal device may send the PUSCH at the PUSCH transmission occasion. That the PUSCH transmission occasion is not at the slot boundary may be understood as: the start location of the PUSCH transmission occasion is not that of the slot; or the end location of the PUSCH transmission occasion is not that of the slot.

In this way, because the PUSCH transmission occasion is not at the slot boundary, the PUSCH does not interfere with transmission or reception of an adjacent slot.

In this embodiment, optionally, that the PUSCH transmission occasion is not at the slot boundary may include at least one of the following cases:

Case 1: There are X OFDM symbols between the start location of the PUSCH transmission occasion and that of the slot.

X may be an integer greater than 0. The farther the terminal device is from the network device, the greater X may be. This is specifically determined based on an actual status, and is not specifically limited herein.

In this embodiment, X may be a predefined value, may be preconfigured by the network device, or may be the maximum TA value. This is not specifically limited herein. The maximum TA value is the maximum value that the network device can configure.

Case 2: There are Y OFDM symbols between the end location of the PUSCH transmission occasion and that of the slot.

Y may be an integer greater than 0. The farther the terminal device is from the network device, the greater Y may be. This is specifically determined based on an actual status, and is not specifically limited herein.

It should be noted that Y may be the same as or different from X as described above.

In this embodiment, Y may be a predefined value, may be preconfigured by the network device, or may be the maximum TA value. This is not specifically limited herein. The maximum TA value is the same as the maximum TA value described above.

Figure 8:
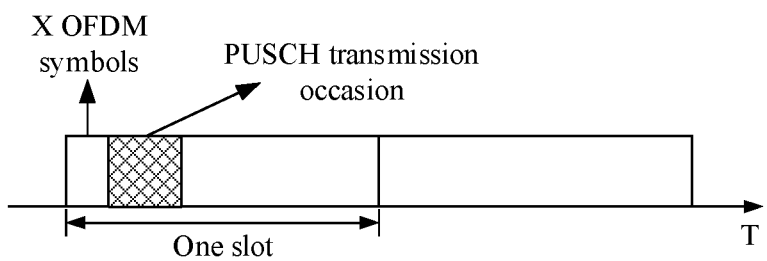
FIG. 8 is a schematic diagram of an information sending method according to an embodiment of the present disclosure.
Figure 9:
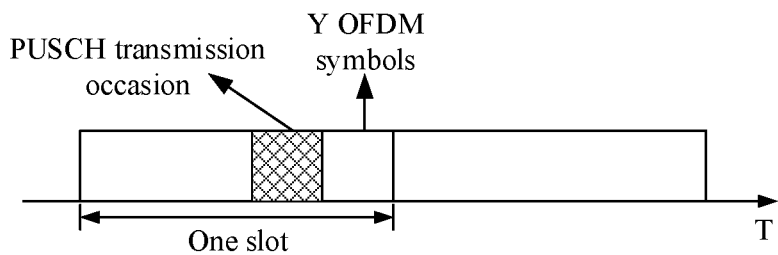
FIG. 9 is a schematic diagram of an information sending method according to an embodiment of the present disclosure.
Figure 10:
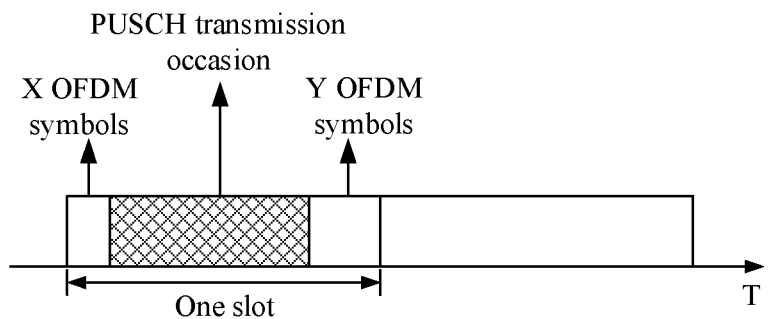
FIG. 10 is a schematic diagram of an information sending method according to an embodiment of the present disclosure.

For ease of understanding, refer to FIGS. 8 to 10.

FIG. 8 shows two slots. In the first slot, there are X OFDM symbols between the start location of the PUSCH transmission occasion and that of the slot. In this case, the terminal device may send the PUSCH at the PUSCH transmission occasion and the PUSCH does not interfere with an adjacent slot.

FIG. 9 shows two slots. In the first slot, there are Y OFDM symbols between the end location of the PUSCH transmission occasion and that of the slot. In this case, the terminal device may send the PUSCH at the PUSCH transmission occasion and the PUSCH does not interfere with an adjacent slot.

FIG. 10 shows two slots. In the first slot, there are X OFDM symbols between the start location of the PUSCH transmission occasion and that of the slot, and there are Y OFDM symbols between the end location of the PUSCH transmission occasion and that of the slot. In this case, the terminal device may send the PUSCH at the PUSCH transmission occasion and the PUSCH does not interfere with an adjacent slot.

It should be noted that, in the three embodiments described above, whether the terminal device sends the PUSCH at the PUSCH transmission occasion may be preconfigured by the network device. For example, when the PUSCH transmission occasion is at the slot boundary, the network device may preconfigure that: the terminal device skips sending the PUSCH at the PUSCH transmission occasion; or the terminal device sends the PUSCH at the PUSCH transmission occasion but skips sending the PUSCH at a boundary of the PUSCH transmission occasion.

In addition, the network device may separately configure whether the terminal device sends the PUSCH at the PUSCH transmission occasion, or configure it together with M, N, X or Y described above.

For example, when M or N is configured by the network device, it may be understood that the network device configures that: when the PUSCH transmission occasion is at the slot boundary, the terminal device sends the PUSCH at the PUSCH transmission occasion but skip sending it at first M OFDM symbols or last N OFDM symbols of the PUSCH transmission occasion.

In summary, in the technical solution provided in the embodiments of the present disclosure, when initiating a 2-step RACH process, the terminal device may obtain the PUSCH transmission occasion; and determine, based on the location relationship between the PUSCH transmission occasion and the slot boundary, whether to send the PUSCH at the PUSCH transmission occasion, where the PUSCH corresponds to the random access message. In this way, the terminal device can determine, based on the location relationship between the PUSCH transmission occasion and the slot boundary, whether to send the PUSCH at the PUSCH transmission occasion. Therefore, when the PUSCH transmission occasion is at the slot boundary, according to the technical solution of the embodiments of the present disclosure, the PUSCH can be prevented from interfering with the transmission or reception of the adjacent slot, thereby guaranteeing the normal communication of the terminal device.

The above describes specific embodiments of this specification. Other embodiments are within the scope of the appended claims. In some cases, the actions or steps described in the claims can be performed in a different order from that in the embodiments and the desired result can still be achieved. In addition, the process described in the accompanying drawings does not necessarily achieve the desired result in a specific order shown or a continuous order. In some implementations, multiple-task processing and parallel processing are also possible or may be advantageous.

Figure 11:
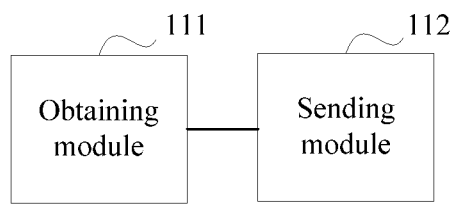
FIG. 11 is a schematic structural diagram of a terminal device according to an embodiment of the present disclosure.

FIG. 11 is a schematic structural diagram of a terminal device according to an embodiment of the present disclosure. The terminal device includes: an obtaining module 111 and a sending module 112.

The obtaining module 111 is configured to obtain a PUSCH transmission occasion.

The sending module 112 is configured to: determine, based on a location relationship between the PUSCH transmission occasion and a slot boundary, whether to send a PUSCH at the PUSCH transmission occasion, where the PUSCH corresponds to a random access message MsgA.

Optionally, that the sending module 112 determines, based on the location relationship between the PUSCH transmission occasion and the slot boundary, whether to send the PUSCH at the PUSCH transmission occasion includes:

if the PUSCH transmission occasion is at the slot boundary, skipping sending the PUSCH at the PUSCH transmission occasion.

Optionally, that the PUSCH transmission occasion is at the slot boundary include at least one of the following:

a start location of the PUSCH transmission occasion is at a start location of a slot; and an end location of the PUSCH transmission occasion is at an end location of the slot.

Optionally, that the sending module 112 determines, based on the location relationship between the PUSCH transmission occasion and the slot boundary, whether to send the PUSCH at the PUSCH transmission occasion includes:

if the PUSCH transmission occasion is at the slot boundary, sending the PUSCH at the PUSCH transmission occasion, and skipping sending the PUSCH at a boundary of the PUSCH transmission occasion.

Optionally, the skipping sending the PUSCH at a boundary of the PUSCH transmission occasion includes at least one of the following:

if a start location of the PUSCH transmission occasion is at a start location of a slot, skipping sending the PUSCH on first M orthogonal frequency division multiplexing (OFDM) symbols of the PUSCH transmission occasion, where M is an integer greater than or equal to 0; and if an end location of the PUSCH transmission occasion is at an end location of the slot, skipping sending the PUSCH on last N OFDM symbols of the PUSCH transmission occasion, where N is an integer greater than or equal to 0.

Optionally, M is a predefined value or is preconfigured by the network device; and N is a predefined value or is preconfigured by the network device;

Optionally, that the sending module 112 determines, based on the location relationship between the PUSCH transmission occasion and the slot boundary, whether to send the PUSCH at the PUSCH transmission occasion includes:

if the PUSCH transmission occasion is not at the slot boundary, sending the PUSCH at the PUSCH transmission occasion.

Optionally, that the PUSCH transmission occasion is not at the slot boundary includes at least one of the following:

there are X OFDM symbols between a start location of the PUSCH transmission occasion and a start location of a slot, where X is an integer greater than 0; and there are Y OFDM symbols between an end location of the PUSCH transmission occasion and an end location of the slot, where Y is an integer greater than 0.

Optionally, X is a predefined value, preconfigured by the network device, or a maximum TA value; and Y is a predefined value, preconfigured by the network device, or a maximum TA value.

The terminal device provided in this embodiment of the present disclosure can implement the processes that are implemented by the terminal device in the method embodiment of FIG. 1. To avoid repetition, details are not described herein again. In this embodiment of the present disclosure, when initiating a 2-step RACH process, the terminal device may obtain the PUSCH transmission occasion; and determine, based on the location relationship between the PUSCH transmission occasion and the slot boundary, whether to send the PUSCH at the PUSCH transmission occasion, where the PUSCH corresponds to the random access message. In this way, the terminal device can determine, based on the location relationship between the PUSCH transmission occasion and the slot boundary, whether to send the PUSCH at the PUSCH transmission occasion. Therefore, when the PUSCH transmission occasion is at the slot boundary, according to the technical solution of the embodiments of the present disclosure, the PUSCH can be prevented from interfering with the transmission or reception of the adjacent slot, thereby guaranteeing the normal communication of the terminal device.

Figure 12:
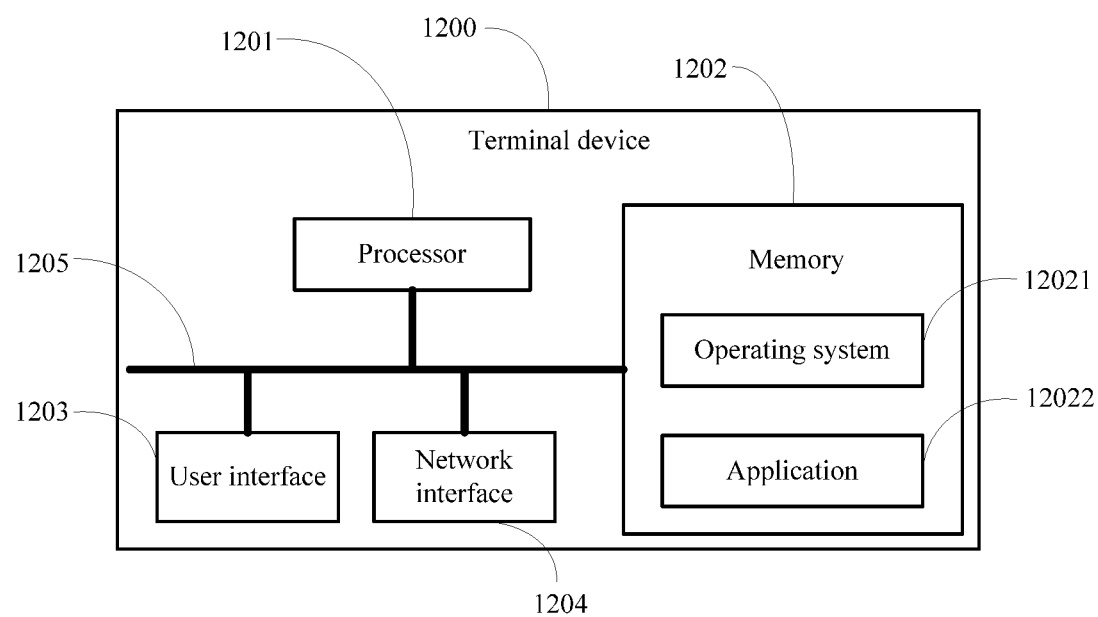
FIG. 12 is a schematic structural diagram of a terminal device according to an embodiment of the present disclosure.

In the embodiments of the present disclosure, the communication device may include: a network device and a terminal device. When the communication device is a terminal device, as shown in FIG. 12, FIG. 12 is a schematic structural diagram of a terminal device according to an embodiment of the present disclosure. As shown in FIG. 12, the terminal device 1200 includes: at least one processor 1201, a memory 1202, at least one network interface 1204, and a user interface 1203. Various components of the terminal 1200 are coupled by using a bus system 1205. It can be understood that the bus system 1205 is configured to implement connection and communication between these components. In addition to a data bus, the bus system 1205 further includes a power bus, a control bus, and a status signal bus. However, for clarity of description, various buses are marked as the bus system 1205 in FIG. 12.

The user interface 1203 may include a display, a keyboard, or a clicking device, for example, a mouse, a trackball, a touch panel, or a touchscreen.

It may be understood that the memory 1202 in this embodiment of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 1202 of the system and the method described in the embodiments of the present disclosure is intended to include, but is not limited to, these and any other suitable types of memories.

In some implementations, the memory 1202 stores the following element: an executable module or a data structure, a subset thereof, or an extended set thereof: an operating system 12021 and an application program 12022.

The operating system 12021 includes various system programs, for example, a framework layer, a kernel library layer, and a driver layer, and is configured to implement various basic services and process hardware-based tasks. The application program 12022 includes various application programs, for example, a media player and a browser, and is configured to implement various application services. A program implementing the method in the embodiments of the present disclosure may be included in the application program 12022.

In some embodiments of the present disclosure, the terminal device 1200 further includes: a computer program stored in the memory 1202 and executable on the processor 1201. When the computer program is executed by the processor 1201, the following steps are performed:

obtaining a PUSCH transmission occasion; and determining, based on a location relationship between the PUSCH transmission occasion and a slot boundary, whether to send a PUSCH at the PUSCH transmission occasion, where the PUSCH corresponds to a random access message.

The information sending method disclosed in the embodiments of the present disclosure may be applied to the processor 1201 or implemented by the processor 1201. The processor 1201 may be an integrated circuit chip having a signal processing capability. During implementation, the steps of the foregoing method may be completed by hardware integrated logic circuits in the processor 1201 or instructions in a form of software. The foregoing processor 1201 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor 1201 may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer readable storage medium is located in the memory 1202, and the processor 1201 reads information from the memory 1202 and completes the steps of the foregoing method in combination with hardware of the processor. Specifically, the computer-readable storage medium stores a computer program, and when the computer program is executed by the processor 1201, the steps of the foregoing embodiment of the information indication method are performed.

It may be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For software implementation, the technology in the embodiments of the present disclosure may be implemented through modules (for example, procedures or functions) that perform the functions in the embodiments of the present disclosure. Software code may be stored in the memory and executed by the processor. The memory may be implemented inside or outside the processor.

The terminal device 1200 can implement each process implemented by the first terminal in the foregoing method embodiment. To avoid repetition, details are not described herein again.

An embodiment of the present disclosure further provides a computer-readable storage medium, where the computer-readable storage medium stores one or more programs. The one or more programs include instructions. When the instructions are executed by a communication device that includes multiple application programs, the communication device can be enabled to execute the method of the embodiment shown in FIG. 1, and is specifically configured to execute the step of the information reporting method described above.

In conclusion, the foregoing descriptions are merely optional embodiments of the present disclosure, but are not intended to limit the protection scope of the present disclosure. Any modification, equivalent replacement, or improvement made without departing from the spirit and principle of the present disclosure shall fall within the protection scope of the present disclosure.

The system, apparatus, module, or unit explained in the above embodiments may be implemented by a computer chip or entity, or implemented by a product with certain functions. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or any combination of these devices.

The computer readable medium includes permanent, non-permanent, removable, and non-removable media and can store information by using any method or technology. The information may be computer-readable instructions, data structures, modules of programs, or other data. Examples of the computer storage medium include but not limited to: a phase-change RAM (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical memory, a magnetic cassette, a magnetic disk storage, another magnetic storage device, and any other non-transmission medium that may be used to store information that can be accessed by a computing device. As defined in this specification, the computer readable medium does not include computer readable transitory media, such as modulated data signals and carriers.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a computer-readable storage medium. Based on such an understanding, the technical solutions of the present disclosure essentially, or the part contributing to the related technologies or the part of the technical solution may be implemented in a form of a software product. The computer software product is stored in a storage medium, and includes a plurality of indications for indicating a computer device (which may be a personal computer, a server, a network device, or the like) to perform all or part of the steps of the method described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a computer-readable storage medium. When the program is executed, the procedures of the embodiments of the foregoing methods may be performed. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For software implementation, the technology in the embodiments of the present disclosure may be implemented through modules (for example, procedures or functions) that perform the functions in the embodiments of the present disclosure. Software code may be stored in the memory and executed by the processor. The memory may be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An information sending method, applied to a terminal device, comprising:
   obtaining a physical uplink shared channel (PUSCH) transmission occasion; and
   determining, based on a location relationship between the PUSCH transmission occasion and a slot boundary, whether to send a PUSCH at the PUSCH transmission occasion, wherein the PUSCH corresponds to a random access message;
   wherein the determining, based on a location relationship between the PUSCH transmission occasion and a slot boundary, whether to send a PUSCH at the PUSCH transmission occasion comprises:
   in response to the PUSCH transmission occasion being not at the slot boundary, sending the PUSCH at the PUSCH transmission occasion;
   wherein the PUSCH transmission occasion being not at the slot boundary comprises at least one of the following:
   there are X OFDM symbols between a start location of the PUSCH transmission occasion and a start location of a slot, wherein X is an integer greater than 0; or
   there are Y OFDM symbols between an end location of the PUSCH transmission occasion and an end location of the slot, wherein Y is an integer greater than 0.

2. The method according to claim 1, wherein the determining, based on a location relationship between the PUSCH transmission occasion and a slot boundary, whether to send a PUSCH at the PUSCH transmission occasion comprises:
   if the PUSCH transmission occasion is at the slot boundary, skipping sending the PUSCH at the PUSCH transmission occasion.

3. The method according to claim 2, wherein that the PUSCH transmission occasion is at the slot boundary comprises at least one of the following:
   a start location of the PUSCH transmission occasion is at a start location of a slot; and
   an end location of the PUSCH transmission occasion is at an end location of the slot.

4. The method according to claim 1, wherein the determining, based on a location relationship between the PUSCH transmission occasion and a slot boundary, whether to send a PUSCH at the PUSCH transmission occasion comprises:

if the PUSCH transmission occasion is at the slot boundary, sending the PUSCH at the PUSCH transmission occasion, and skipping sending the PUSCH at a boundary of the PUSCH transmission occasion.

5. The method according to claim 4, wherein the skipping sending the PUSCH at a boundary of the PUSCH transmission occasion comprises at least one of the following:
if a start location of the PUSCH transmission occasion is at a start location of a slot, skipping sending the PUSCH on first M orthogonal frequency division multiplexing (OFDM) symbols of the PUSCH transmission occasion, wherein M is an integer greater than or equal to 0; and
if an end location of the PUSCH transmission occasion is at an end location of the slot, skipping sending the PUSCH on last N OFDM symbols of the PUSCH transmission occasion, wherein N is an integer greater than or equal to 0.

6. The method according to claim 5, wherein
M is a predefined value or is preconfigured by the network device; and
N is a predefined value or is preconfigured by the network device.

7. The method according to claim 1, wherein
X is a predefined value, preconfigured by the network device, or a maximum timing advance (TA) value; and
Y is a predefined value, preconfigured by the network device, or a maximum TA value.

8. A non-transitory computer-readable storage medium, wherein the non-transitory computer-readable storage medium stores a computer program, and when the computer program is executed by a processor, the steps of the method according to claim 1 are implemented.

9. A terminal device, comprising a memory, a processor, and a computer program stored in the memory and capable of running on the processor, wherein when the computer program is executed by the processor, an information sending method is implemented, and the method comprises:
obtaining a physical uplink shared channel (PUSCH) transmission occasion; and
determining, based on a location relationship between the PUSCH transmission occasion and a slot boundary, whether to send a PUSCH at the PUSCH transmission occasion, wherein the PUSCH corresponds to a random access message;
wherein the determining, based on a location relationship between the PUSCH transmission occasion and a slot boundary, whether to send a PUSCH at the PUSCH transmission occasion comprises:
in response to the PUSCH transmission occasion being not at the slot boundary, sending the PUSCH at the PUSCH transmission occasion;
wherein the PUSCH transmission occasion being not at the slot boundary comprises at least one of the following:
there are X OFDM symbols between a start location of the PUSCH transmission occasion and a start location of a slot, wherein X is an integer greater than 0; or
there are Y OFDM symbols between an end location of the PUSCH transmission occasion and an end location of the slot, wherein Y is an integer greater than 0.

10. The terminal device according to claim 9, wherein the determining, based on a location relationship between the PUSCH transmission occasion and a slot boundary, whether to send a PUSCH at the PUSCH transmission occasion comprises:
if the PUSCH transmission occasion is at the slot boundary, skipping sending the PUSCH at the PUSCH transmission occasion.

11. The terminal device according to claim 10, wherein that the PUSCH transmission occasion is at the slot boundary comprises at least one of the following:
a start location of the PUSCH transmission occasion is at a start location of a slot; and
an end location of the PUSCH transmission occasion is at an end location of the slot.

12. The terminal device according to claim 9, wherein the determining, based on a location relationship between the PUSCH transmission occasion and a slot boundary, whether to send a PUSCH at the PUSCH transmission occasion comprises:
if the PUSCH transmission occasion is at the slot boundary, sending the PUSCH at the PUSCH transmission occasion, and skipping sending the PUSCH at a boundary of the PUSCH transmission occasion.

13. The terminal device according to claim 12, wherein the skipping sending the PUSCH at a boundary of the PUSCH transmission occasion comprises at least one of the following:
if a start location of the PUSCH transmission occasion is at a start location of a slot, skipping sending the PUSCH on first M orthogonal frequency division multiplexing (OFDM) symbols of the PUSCH transmission occasion, wherein M is an integer greater than or equal to 0; and
if an end location of the PUSCH transmission occasion is at an end location of the slot, skipping sending the PUSCH on last N OFDM symbols of the PUSCH transmission occasion, wherein N is an integer greater than or equal to 0.

14. The terminal device according to claim 13, wherein
M is a predefined value or is preconfigured by the network device; and
N is a predefined value or is preconfigured by the network device.

15. The terminal device according to claim 9, wherein
X is a predefined value, preconfigured by the network device, or a maximum timing advance (TA) value; and
Y is a predefined value, preconfigured by the network device, or a maximum TA value.

* * * * *